United States Patent [19]

Schmidt

[11] Patent Number: 4,657,716
[45] Date of Patent: Apr. 14, 1987

[54] METHOD OF MAKING ELASTOMERIC SHOE SOLES

[75] Inventor: Oskar J. Schmidt, Bruck/Leitha, Austria

[73] Assignee: Lim Kunststoff Technologie Gesellschaft, Kittsee, Austria

[21] Appl. No.: 676,732

[22] Filed: Nov. 30, 1984

[30] Foreign Application Priority Data

Mar. 19, 1984 [AT] Austria .................................. 921/84

[51] Int. Cl.⁴ ...................... B29C 67/22; B29C 41/06; B29C 41/20

[52] U.S. Cl. ........................ 264/45.7; 36/29; 264/46.4; 264/46.6; 264/244; 264/310; 264/DIG. 83

[58] Field of Search ................ 36/29; 264/45.7, 244, 264/310, 311, DIG. 83

[56] References Cited

U.S. PATENT DOCUMENTS

| | | |
|---|---|---|
| 2,256,329 | 9/1941 | Szerenyi et al. .................... 264/244 |
| 2,477,899 | 8/1949 | Rempel .......................... 264/310 X |
| 2,918,703 | 12/1959 | Beal ............................. 264/310 X |
| 3,002,230 | 10/1961 | Stewart ......................... 264/244 X |
| 3,021,572 | 2/1962 | Smith, Jr. ........................ 264/310 |
| 3,668,056 | 6/1972 | Hayes, Jr. ...................... 264/310 X |
| 3,981,955 | 9/1976 | Otani et al. ..................... 364/311 X |

FOREIGN PATENT DOCUMENTS

| | | |
|---|---|---|
| 2106546 | 8/1972 | Fed. Rep. of Germany ... 264/DIG. 83 |
| 1410645 | 10/1975 | United Kingdom ............... 264/45.7 |

Primary Examiner—Philip Anderson
Attorney, Agent, or Firm—Karl F. Ross; Herbert Dubno

[57] ABSTRACT

A shoe sole of elastomeric material is formed with at least one pressurized gas cell at least one wall of which is defined by a layer in which a substantially inextensible reinforcement is embedded to prevent bulging. The cell envelope can be formed by rotational casting of a liquid material within a cavity of a wear layer to simultaneously penetrate the reinforcing layer.

5 Claims, 7 Drawing Figures

METHOD OF MAKING ELASTOMERIC SHOE SOLES

FIELD OF THE INVENTION

Our present invention relates to shoe soles composed of elastomeric materials, especially polyurethanes, and more particularly, to shoe soles provided with gas cushions and composed of such materials. The invention also relates to an improved method of making such soles.

BACKGROUND OF THE INVENTION

In order to improve walking and running comfort, it has been proposed to provide shoe soles of elastomeric material in which gas-cushion cells are formed, these cells trapping a gas, generally air, at a superatmospheric pressure and forming compressible volumes with an elasticity brought about by the compressibility of the gas trapped therein.

Such soles can be composed of polyurethane or other elastomeric materials and include the elastic cushion which can extend over a large area or need merely be one of a number of cells or volumes of pressurized gas trapped in the sole.

The cushion can be formed upon an assembly of the sole from a number of parts.

While the cushioning effect has contributed to the comfort of such soles, the latter have not been fully satisfactory. With wear of the material, the sole in the region of the cushion or sole tends to bulge outwardly if the pressure of the cushion is retained and indeed, such bulging has been a problem. If, of course, the material in which the cushion or sole is formed is made of increased density or stiffness to prevent the bulging, the overall resiliency and cushioning effect is reduced. In practice, therefore, it has not been possible heretofore to reduce the outwardly bulging effect which has rendered earlier shoe soles of the trapped pressurized gas-cushion type ineffective.

OBJECTS OF THE INVENTION

It is the principal object of the present invention to provide a shoe sole which overcomes these disadvantages, i.e. which is designed to significantly reduce the tendency of the sole to bulge in the region of the trapped pressurized gas cushion or cell.

Another object of this invention is to provide an improved method of making a gas-cushion shoe sole of this type.

SUMMARY OF THE INVENTION

These objects and others which will become apparent hereinafter are attained, in accordance with the invention, by providing a shoe sole composed of elastomeric material and having at least one wall of the elastomeric material defining a trapped pressurized gas cushion, at least one layer of this wall having embedded therein a reinforcing insert or inlay of substantially inextensible material, e.g. fiber, filaments, cords, bands, strips, fabric, mesh or foil. By "substantially inextensible", it is meant that the reinforcing layer should be flexible but incapable of stretching or should be stretchable only to a very limited extent.

It is found, quite surprisingly, that by utilizing an elastomeric material in which such a substantially inextensible reinforcing layer is embedded, it is possible to retain the cushioning effect while precluding the bulging of the gas sole or cushion region even when the latter extends over a large area of the sole.

According to another aspect of the invention, in a method of making such a shoe sole, a wear layer (adapted to constitute the outermost ground-engaging surface of the sole) is placed in a mold or form for producing the sole and upon this wear layer, a reinforcing layer is placed.

The mold can then be closed while, of course, being formed with means for establishing the gas cell therein, and a second elastomeric layer is applied in a rotary casting system. This second elastomeric layer permeates the reinforcing inlay, bonds to the wear layer and the inlay and defines the outer or lower wall defining the gas cushion.

With the method of the invention, it is not necessary to utilize a core to form the hollow space adapted to constitute the gas cushion since the application of the second layer in a rotary casting operation distributes the elastomeric material of the second layer around the space which will eventually be occupied by the pressurized gas. The rotary casting is carried out in any conventional manner, e.g. in the manner utilized to make rubber doll heads or body structures, utilizing the same principles to control the thickness of the elastomeric layer all around the gas cushion space.

It is possible, in accordance with another feature of the invention, to embed a second reinforcing inlay in the wall adapted to form the upper wall of the gas cushion and to impregnate or permeate this inlay with the elastomeric material distributed by the rotational casting. The second inlay, of course, is positioned in the mold with spacing from the first inlay.

A second inlay need not be used when the sole is to be provided with an upper of a shoe, e.g. with an insole.

The filling of the cavity which is left by the rotational casting, i.e. the spinning of the mold about an axis after introduction of the elastomeric material therein, with gas under pressure can be effected in a simple way when the second layer is formed in a compartment which is maintained under a superatmospheric pressure and the elastomeric material is then charged into the mold under this pressure. Following rotational casting and hardening, the space surrounded by the material is found to be at this superatmospheric pressure.

Alternatively, after the second layer is formed, gas can be injected into the cell at a superatmospheric pressure. Of course, the cell can be formed by bonding together a multiplicity of layers at least one of which can have a reinforcing inlay embedded therein.

The cell or each cell can be provided with a valve through which the cell can be pressurized and which can allow the degree of pressurization to be adjusted during use of the sole, e.g. by the user directly.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
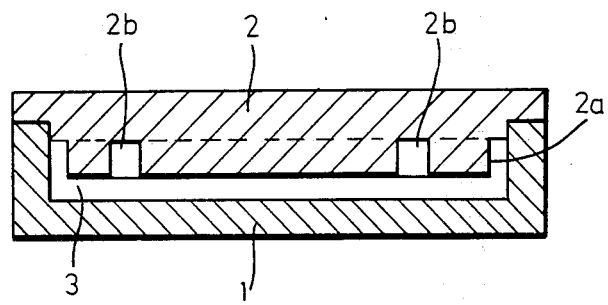
FIG. 1 is a section through a mold, seen in the region of the recesses adapted to form the air cushions, for the formation of the first layer, this section being taken in a plane corresponding to the section plane V—V in FIG. 4.
Figure 4:
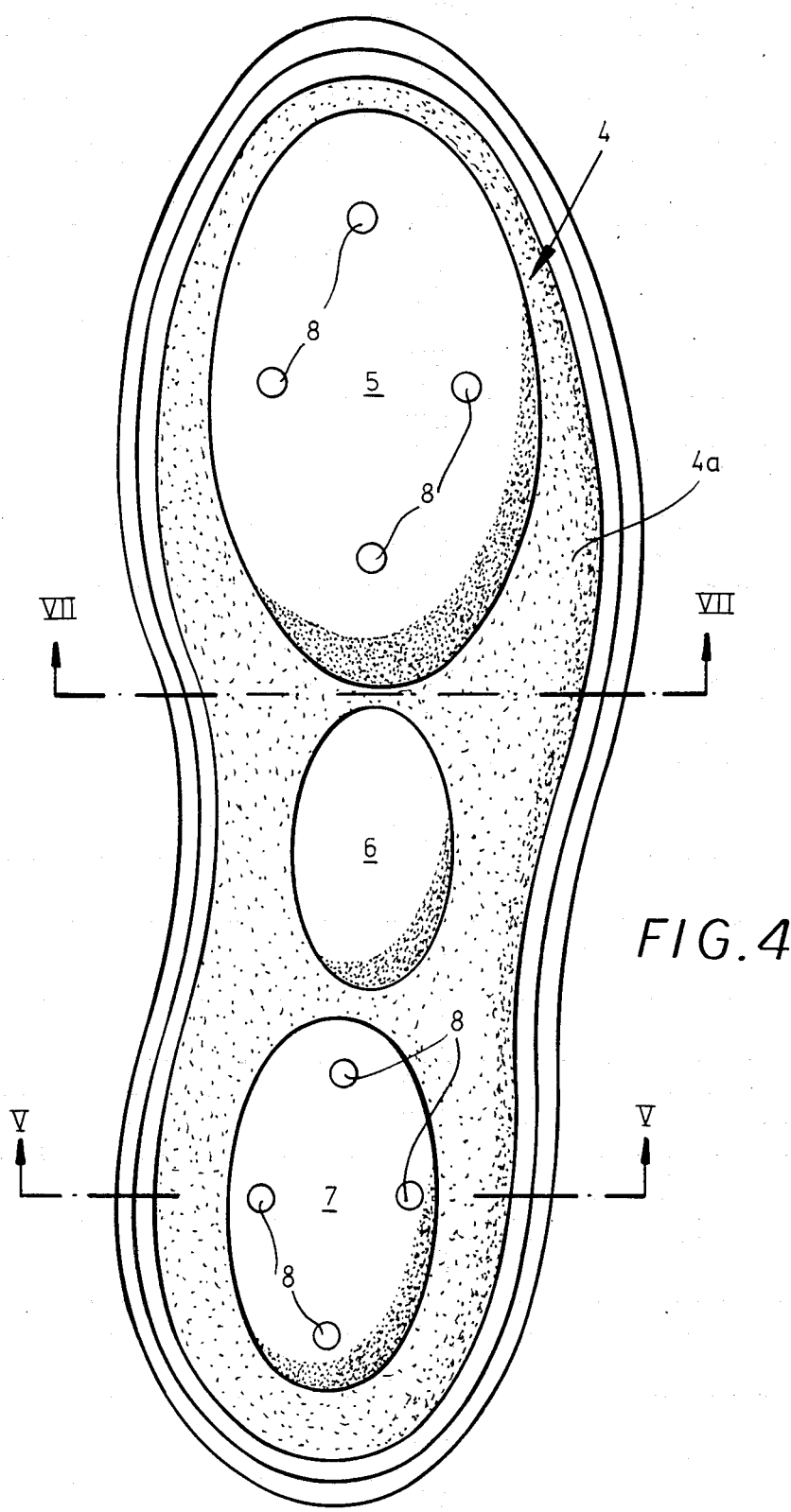
FIG. 4 is a plan view of the mold of FIG. 1 after the first layer has been formed and with the top member of the mold removed.

The mold shown in FIG. 1 comprises a lower member 1 and an upper member 2 which together define a mold cavity 3 which can form, as shown in FIG. 4, lands 4a and recesses 5, 6 and 7 in an elastomeric wear layer represented at 4 at the ball, arch and heel portions of a sole which can be molded from foamed polyurethane of high density or nonfoaming polyurethane in the mold cavity.

The mold cavity 3 is in the form of a shoe sole as shown in FIG. 4 which has three recesses 5, 6 and 7 formed by complementary projections 2a on the upper member 2 of the mold.

Figure 5:
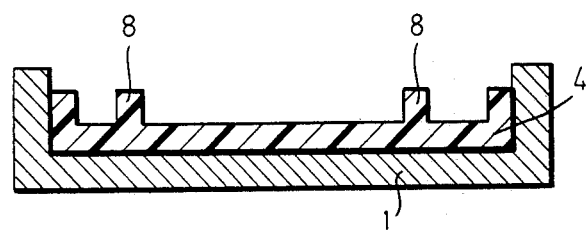
FIG. 5 is a section taken along the line V—V of FIG. 4.

Pins 8 can extend into the recesses 5, 6 and 7 and can be formed unitarily on the elastomeric wear layer 4 (see FIG. 5) as the molded material fills the blind bores 2b of the projecting portions 2a.

In the fabrication of the sole according to the invention, the wear layer 4 is formed first by injection molding utilizing the commercial thermoplastic polyurethane granules marketed, for example, under the name Eatane by B. F. Goodrich Co.

Figure 2:
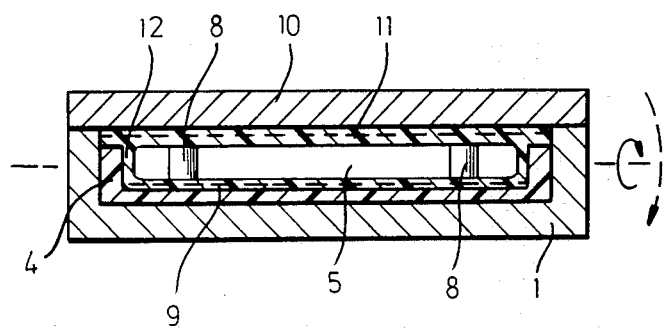
FIG. 2 is a view of the mold for the formation of the second layer by rotational casting within the recess and after the reinforcing inlay has been inserted in section in the same plane as FIG. 1.

The upper member 2 of the mold is then removed, reinforcing layers 9, e.g. glass fiber fabric shown as broken lines in FIG. 2, cut to the shape of the recesses 5, 6 and 7, are laid into the latter and are anchored against movement on the pins 8 which have been formed unitarily with the wear layer 4 and project into the recesses. The mold is closed.

The two-component polyurethane mixing and metering device is then used to inject a predetermined amount of the hardenable but flowable mixture into the mold cavity now defined between the wear layer 4 and a cover 10 which is applied to the mold.

The closed mold is then mounted on a rotational casting machine in an autoclave and is charged with gas at a superatmospheric pressure and is spun about two or more axes with the ground-engaging surface of the wear layer 4 facing outwardly until an inner layer is formed and hardens. The inner layer 12 is thus centrifugally forced into the reinforcing layers 9 and distributed uniformly over the interior surfaces of the latter mold and wear layer 4 to completely enclose the recesses at the pressure of the autoclave. When removed from the mold, a sole is obtained which is reinforced along the outer wall of each gas-enclosing cell at the ball, arch and heel portions of the sole by the reinforcing layer 9. An upper reinforcement 11, shown as broken lines in FIG. 2, can be laid over the cavity 3 and wear layer 4 and can also be impregnated with the inner layer 12 during the rotational distribution and hardening step.

The elastomeric material forming this layer 12 should have a sufficiently long pot life to enable its injection into the mold and its distribution therein while the mold is stationary and should be fluid for a sufficiently long time to allow uniform distribution of the flowable material during rotation.

A specific example of a composition which is suitable is the mixture formed from the adiprene prepolymer with low NCO content marketed by Uniroyal and the sterically hindered diamine such as orthochlorobisaniline.

The wear layer 4 remains exposed after the inner layer is applied.

Figure 6:
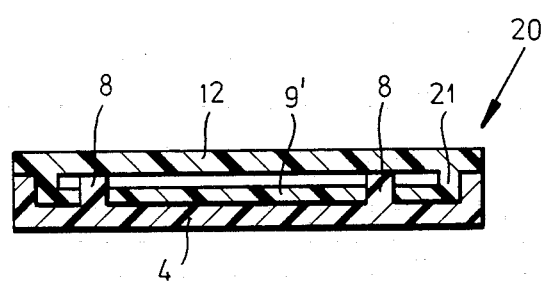
FIG. 6 is a section corresponding to the section of FIG. 5 through the sole after the latter has been completed.
Figure 7:
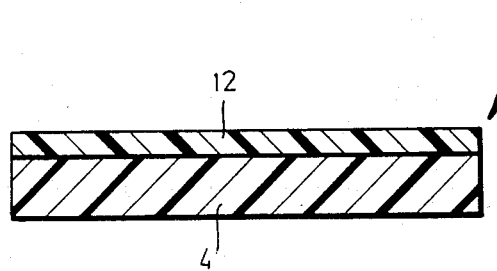
FIG. 7 is a section taken along the line VII—VII of FIG. 4.

The shoe sole has been shown generally at 20 in FIG. 6 and FIG. 7 and alternatively the recesses thereof can be pressurized by piercing at 21 (FIG. 6) thereby forming a self-closing valve by the elasticity of the material forming the shoe sole. When adjustment of the pressure within the cell is required, a conventional pin as used for the inflation of basket balls, for example, can be inserted to relieve the pressure or to increase the pressure by connecting it to a pump.

In FIG. 6 and lternative type of reinforcing fabric 9' has been illustrated

A shoe sole in accordance with the invention can be formed by preparing the lower member of the sole with its wear layer in one mold and the upper part of the sole in a second mold, at least the recesses of the lower part having a reinforcing inlay embedded or bonded therein. With a chamber trapped between them, these two members can be bonded together, e.g. by an adhesive.

Figure 3:
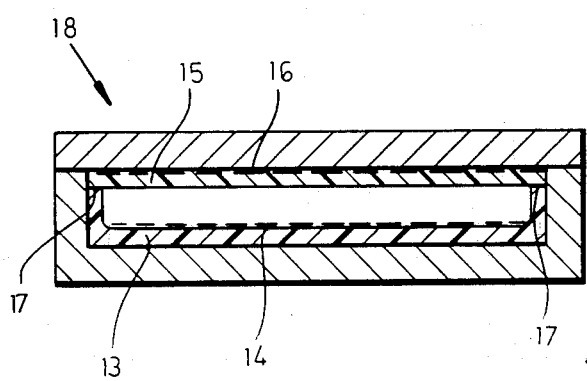
FIG. 3 shows a mold utilizing an alternative laminating approach to the formation of the sole according to the invention taken in a plane slightly offset from the planes of FIGS. 1 and 2 so that the pins cannot be seen.

This fabrication method has been illustrated in FIG. 3.

FIG. 3 shows that the wear layer 13 can be formed in the same manner as the wear layer 4 previously described. In this case, however, the reinforcing layer 14 is immersed and impregnated in an adhesive and laid onto the wear layer 13 within the recesses.

The upper layer 15 can also be injection molded in the same manner as the wear layer 4 and can even be provided in a similar manner with an adhesively applied reinforcing inlay on layer 16. The contacting surfaces 17 of the two members 13 and 15 are then coated with adhesive and placed in the mold 18 which is closed and under pressure until the adhesive hardens. Upon removal of the sole from the mold, the gas can be injected into the recesses by a needle and the injection opening can be fused shut or self-closing by the elasticity of the material forming the shoe sole.

In accordance with the invention, the principal and form of the recesses or cavities can be varied and in place of rotation about several axes in the rotational casting as diagrammatically illustrated in FIG. 2, rotation about a single axis may be used, or in the case of the embodiment associated with FIG. 3, no rotation of the mold is necessary.

What is claimed is:

1. A method of making a shoe sole having a heel portion, an arch portion, a foot-ball portion, and a ground-engaging surface, which comprises the steps of:
    molding in a mold formed with a cavity shaped as a shoe sole and having a first recess-forming removable cover a wear layer of an elastomeric material in the shape of a shoe sole with a recess being formed at at least one of said portions said recess being elliptical and having a major axis thereof extending in a longitudinal direction of said shoe sole;

removing said first cover from said mold;

disposing a layer of substantially nonextensible reinforcing material against said wear layer along a botton wall of said recess, lying substantially parallel to said surface, said reinforcing layer having the same outline as said recess and extending to a boundary thereof; and rotationally casting in said mold provided with a second removable cover spaced from said wear layer a flowable elastomeric material on said wear layer so that said flowable elastomeric material penetrates into said reinforcing material and said reinforcing material is embedded in said flowable elastomeric material, while lining said recess and an inner surface of said second cover and defining in said recess a sealed gas-enclosing cell substantially coextensive with said recess.

2. The method defined in claim 1 wherein said flowable elastomeric material is injected into said mold cavity containing said wear layer substantially coextensive therewith, and said gas-enclosing cell is formed under superatmospheric pressure in said mold cavity.

3. The method defined in claim 1, further comprising the step of injecting compressed air into said gas-enclosing cell.

4. The method defined in claim 1 wherein said flowable elastomeric material is injected into said mold cavity containing the wear layer and the mold cavity is then rotated, said method comprising lining said mold cavity with another layer of reinforcing material which is embedded in said flowable material opposite the first mentioned layer of reinforcing material.

5. The method defined in claim 1 wherein such recesses and gas-enclosing cells are formed over major areas of each of said portions.

* * * * *